United States Patent [19]
Softness

[11] Patent Number: 4,991,815
[45] Date of Patent: Feb. 12, 1991

[54] MIRROR ASSEMBLY

[75] Inventor: Donald G. Softness, West Islip, N.Y.

[73] Assignee: Susan E. Lauter, Inc., New York, N.Y.

[21] Appl. No.: 245,470

[22] Filed: Sep. 16, 1988

[51] Int. Cl.$^5$ .................................................. B60R 1/00
[52] U.S. Cl. .................................... 248/487; 248/278; 350/636
[58] Field of Search ............... 248/466, 474, 476, 479, 248/485, 486, 487, 495, 122, 179, 183, 274, 278, 289.1, 291, 324; 403/87, 91, 92, 58, 57; 350/631, 632, 636, 629

[56] References Cited

U.S. PATENT DOCUMENTS

| | | | |
|---|---|---|---|
| 755,668 | 3/1904 | Hurxthal | 248/487 |
| 1,394,440 | 10/1921 | Oishei | 248/487 |
| 2,523,118 | 9/1950 | Jones | 248/278 |
| 2,596,632 | 5/1952 | Whitehead | 248/487 |
| 2,616,648 | 11/1952 | Budreck | 248/278 |
| 2,970,289 | 1/1961 | Loomis | 248/274 |
| 3,128,982 | 4/1964 | Christopher | 248/183 |
| 4,687,305 | 8/1987 | Harris | 350/632 |

FOREIGN PATENT DOCUMENTS

| | | | |
|---|---|---|---|
| 435726 | of 1926 | Australia | 248/487 |
| 454099 | 9/1936 | United Kingdom | 248/122 |

Primary Examiner—Ramon O. Ramirez
Assistant Examiner—Robert A. Olson
Attorney, Agent, or Firm—Gottlieb, Rackman & Reisman

[57] ABSTRACT

A mirror assembly which may be mounted on a wall or beam is provided. The assembly includes a base which is mounted to a wall or beam, a pedestal connected to the base and a mirror or mirror connected to the pedestal. The mirror may rotate with respect to the pedestal about a first axis defined by the longitudinal axis of the pedestal and about a second axis perpendicular to the first axis. This enables the position of the mirror to be easily adjusted when the assembly is mounted on a wall or beam, in order to enable the assembly to be used at various locations where expanded viewing of an area is desirable.

21 Claims, 2 Drawing Sheets

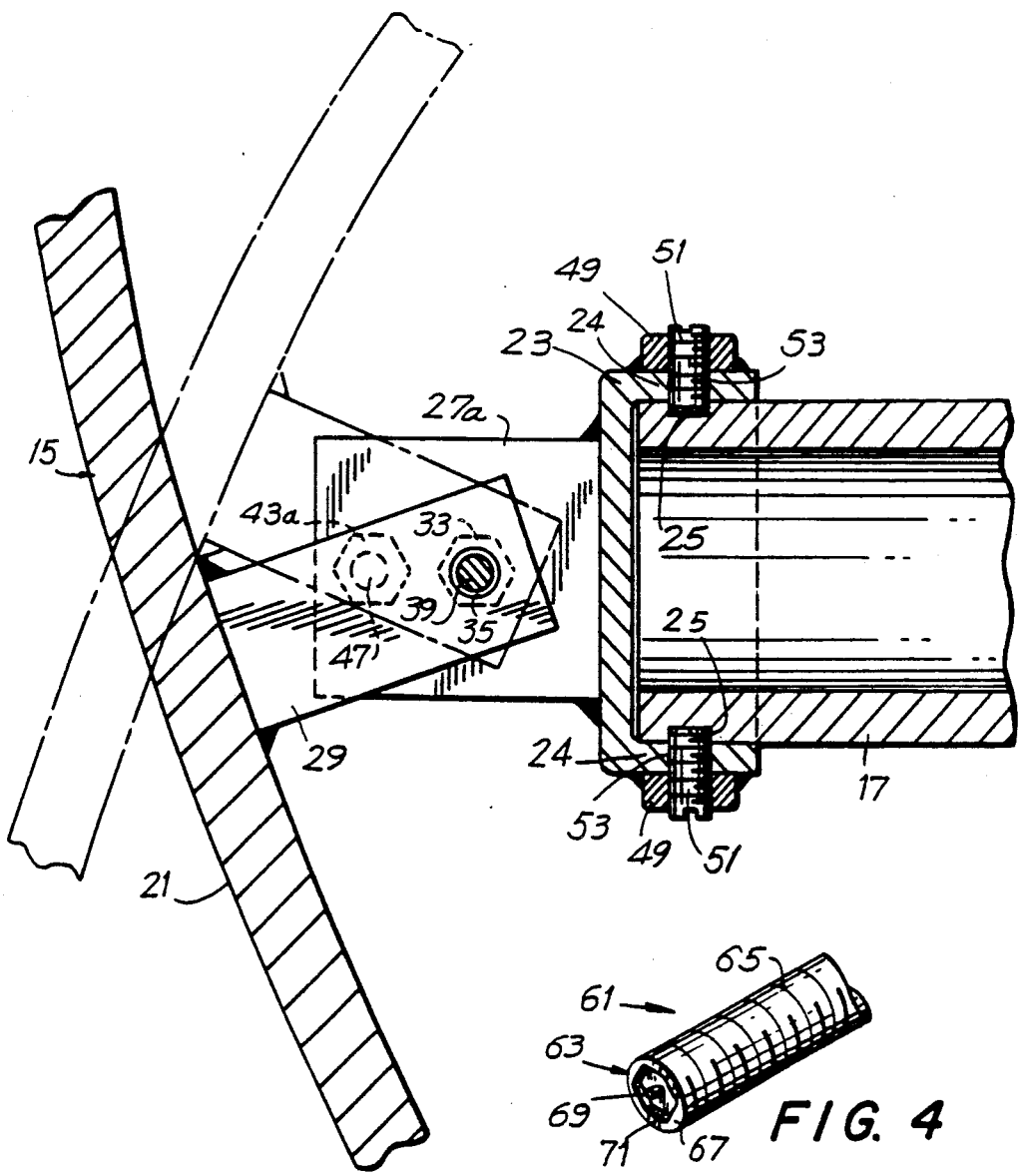

MIRROR ASSEMBLY

BACKGROUND OF THE INVENTION

This invention relates to a mirror assembly, and more particularly to a mirror assembly in which the mirror is supported on a beam or wall and may be rotatably adjusted in position about both a first axis and a second axis perpendicular to the first axis.

As is well known, subway stations and waiting areas are becoming increasingly unsafe for individuals, especially late at night when the stations are empty and the trains run infrequently. Although a subway token collector and possibly a policeman is present at or adjacent to the subway station entrance, they cannot often observe individuals entering the turnstiles or those waiting for a train along the train platform since those individuals are out of the token attendant's and/or policeman's view.

One partial solution to this problem is to designate a certain portion of the subway platform as a secure waiting area, where the token attendant or security officer may be able to see the waiting rider from their booth or patrol area. Nevertheless, since many subway station tunnels are rather narrow, this designated waiting area can be very small, and limits the area in which the subway rider may wait for the oncoming train.

Another problem is that train conductors often cannot see the entire subway platform when the train is discharging and picking up passengers. This is especially true if the platform is crowded, or the station is curved. As a result, the conductor may close the train doors and start the train before discharge and pick-up is complete, possible catching passengers in the closing doors.

One suggestion to the above-mentioned problems is to use mirrors appropriately placed on walls and/or beams of the subway station tunnel, which will enable the token attendant and/or policeman to see a far greater area along the train platform when located in the token booth or a patrol area, or enable the train conductor to see a larger area on the platform when the train is stopped at a subway station.

However, the use of mirrors for various subway stations requires the mirrors to be individually mounted and adjusted with respect to the wall or beam, depending on the station and train platform to be observed.

In addition, once the mirror is adjusted, it is essential that it cannot be moved out of alignment by ordinary physical force, such as by vandals who often frequent subway stations.

Further, once this adjustment is made, it is important that it be maintained, i.e., that the mirror remain in the desired orientation with respect to the wall or beam because it is unlikely that sufficient personnel will be available to routinely readjust the mirror.

Accordingly, it is desirable to provide a mirror assembly which can be used in any subway or train station, and in which the mirror may be appropriately adjusted in position so that the token booth attendant can clearly observe at least a large portion of the subway platform and that the mirror remain in the appropriate position once adjusted despite any unauthorized attempt to disturb the position.

SUMMARY OF THE INVENTION

Generally speaking, in accordance with the invention, a mirror assembly which may be mounted on a wall or beam is provided. The assembly includes a base which is mounted to a wall or beam, a pedestal connected to the base and a mirror connected to the pedestal. The mirror may rotate with respect to the pedestal about a first axis defined by the longitudinal axis of the pedestal and about a second axis perpendicular to the first axis. This enables the position of the mirror to be easily adjusted when the assembly is mounted on a wall or beam, in order to enable the assembly to be used at various locations where expanded viewing of an area is desirable.

Accordingly, it is an object of the invention to provide an improved mirror assembly which holds its orientation once adjusted.

A further object of the invention is to provide a mirror assembly which is tamper-resistant when mounted.

Still another object of the invention is to provide a mirror assembly in which the mirror can rotate about both a first axis and about a second axis perpendicular to the first axis.

Yet a further object of the invention is to provide a mirror assembly suitable for use in subway and train stations.

Still other objects and advantages of the invention will in part be obvious and will in part be apparent from the following description.

The invention accordingly comprises features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 3 is a cross-sectional view taken along line 3—3 of FIG. 2; and

FIG. 4 is a perspective view of the set screw used in the mirror assembly of the invention.

DETAILED DESCRIPTION OF THE PREFERRED EMBODIMENT

Figure 1:
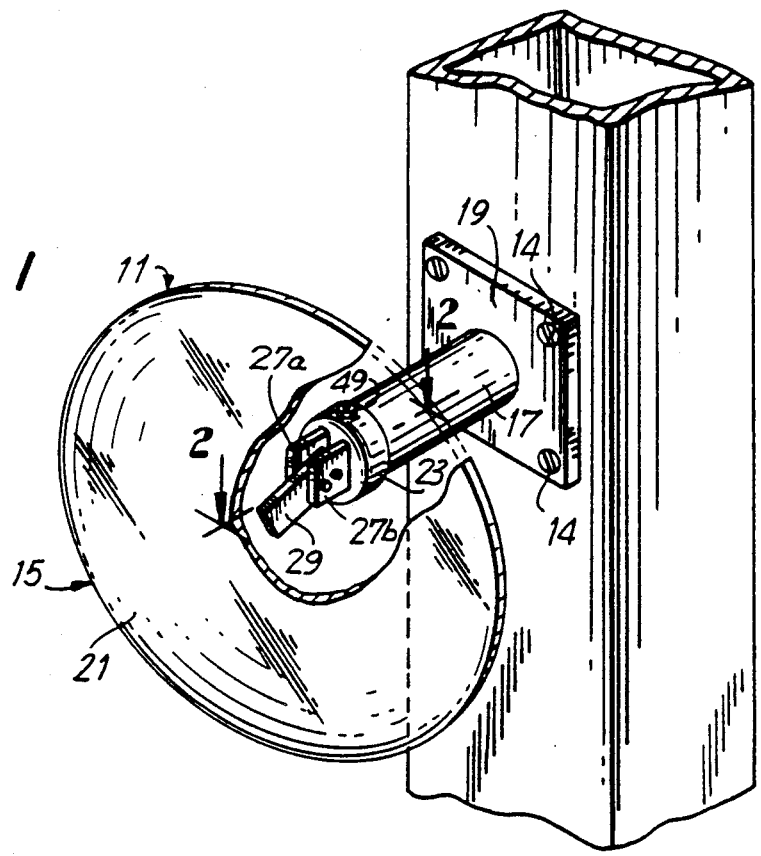
FIG. 1 is a perspective view of the mirror assembly of the invention mounted on a wall or a beam.

Referring first to FIG. 1, a mirror assembly made in accordance with the invention is generally indicated at 11, and includes a base or plate 19, a cylindrical pedestal 17 supported on base 19 and a convex mirror 15 pivotally connected to pedestal 17, as described below. Base 19 is substantially rectangular in shape and is mounted to a beam 13 by means of screw members 14 in a conventional manner, as illustrated in FIG. 1. When mounted on beam 13, base 19 is maintained substantially fixed thereon, enabling mirror assembly 11 to be rigidly supported by beam 13.

Figure 2:
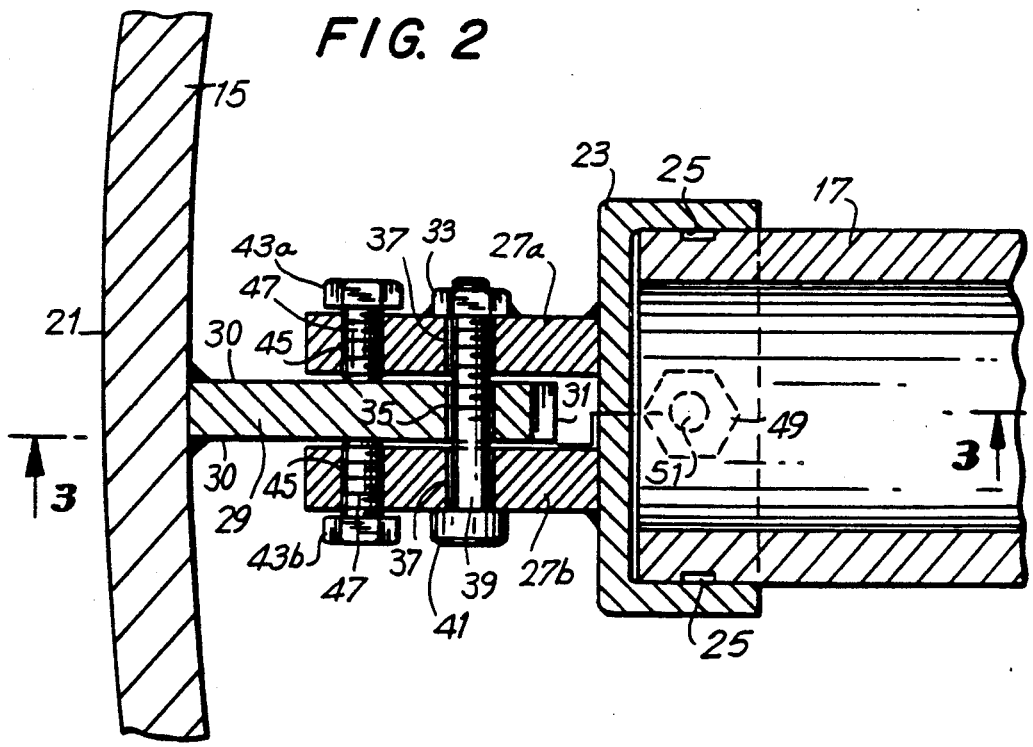
FIG. 2 is a cross-sectional view taken along line 2—2 of FIG. 1.

Turning now to FIG. 2, the mechanism for enabling mirror 15 to rotatably pivot with respect to pedestal 17 is now described. A cylindrical cap member 23 is rotatably mounted on one end of pedestal 17. Cap member 23 has welded thereto and extending perpendicular to its external planar surface a pair of parallel plates 27a and 27b which define a gap 31 therebetween. Each of parallel plates 27a and 27b includes respective coaxially aligned lower holes 37 extending therethrough and respective, preferably coaxially aligned upper holes 45 also extending therethrough. Plate 27a further includes a welded nut 33 disposed about hole 37. Similarly, both plates 27a and 27b are formed with welded nuts 43a and 43b respectively, disposed about holes 45. Holes 37 and 45 formed in parallel plates 27a and 27b are suitable for receiving an appropriately dimensioned screw, as described below.

Continuing with FIG. 2, mirror 15 includes an outer mirrored surface 21 and an arm 29 of substantially rectangular cross section extending from the inside surface thereof. Arm 29 is welded to the inside surface (or is attached using epoxy), extends perpendicularly therefrom, and is dimensioned so that it may be received within gap 31 defined between parallel plates 27a and 27b and includes a passageway 35 extending therethrough at the lower end thereof. Passageway 35 of arm 29 is disposed so that it may be aligned with holes 37 of parallel plates 27a and 27b when arm 29 is received within gap 31.

During assembly, arm 29 is matingly received within gap 31 of parallel plates 27a and 27b so that holes 37 and passageway 35 are aligned. Then, a screw 39 is disposed over hole 37 of plate 27b and threaded through holes 37 and passageway 35 so that the tip thereof fits within welded nut 33. As a result, screw 39 acts as a pivot support and enables mirror 15 to rotatably pivot with respect to pedestal 17 about an axis perpendicular to the longitudinal axis of pedestal 17.

To enable mirror assembly to be fixed at a desired angular position about that axis, a pair of set screws 47 are provided, and are received within holes 45 of parallel plates 27a and 27b. When the desired position of mirror 15 is achieved, set screws 47 are tightened in a conventional manner so that the ends thereof press against surfaces 30 of arm 29. Consequently, mirror 15 is fixed in position with respect to pedestal 17 in a first axial direction.

Turning now to FIG. 3, the mechanism for enabling rotation of mirror assembly 15 in a second axial direction with respect to pedestal 17 is provided. As is shown in FIG. 3, cap 23 of pedestal 17 includes an annular extending sleeve 24 formed with at least a pair of holes 53. Sleeve 24 includes a corresponding number of welded nuts 49 disposed about respective holes 53. Holes 53 formed in sleeve 24 are situated directly over an annular groove 25 formed within pedestal 17.

During assembly, after cap 23 is mounted on pedestal 17, set screws 51 are inserted within holes 53, as shown in FIG. 3. Cap 23 may then be rotated or turned about pedestal 17 in order to rotate the assembly about the longitudinal axis of pedestal 17. Once an appropriate position is achieved for mirror 15, set screws 51 are tightened within holes 45 so that they abut against the circumferential surface of annular groove 25. As a result, mirror 15 is securely fixed in position with respect to pedestal 17 in a second axial direction.

Although mirror 15 will remain securely in position, it is required that the position of mirror 15 be adjusted. Therefore, depending on the axial rotation required, either set screws 47 of parallel plates 27a and 27b, or set screws 51 of cap 23, are loosened. This enables the pivotal rotation of mirror 15 in the direction desired. Once the desired new position is achieved, the set screws which have been loosened are re-tightened, as described above, and assembly 11 is again ready for use.

Turning to FIG. 4, a particular type of set screw 61 suitable for use in the inventive assembly is illustrated. Set screw 61 includes a head 63 and a threaded portion 65. Head 63 includes a hexagonal rim 67 and a projecting pin 69 which define a substantially annular opening 71 therebetween. Screw 61 is tightened or loosened by an "Allen" wrench (not shown), the head of which being sized for mating engagement with head 63 of screw 61 and including an opening shaped for receiving pin 69.

The mirror assembly of the invention is preferably made of stainless steel. As a result, the assembly is dent and scratch resistant. Additionally, the assembly will not corode or discolor and may be easily cleaned of graffiti, adhesive posters and the like.

The mirror assembly of the invention is particularly suitable for being mounted in train or bus stations, to enable the token representative or security official to expand his or her view of the passenger waiting area.

Since the position of the mirror is fixed after adjustment by tightening appropriately the various set screws, the mirror's position cannot be disturbed by vandals and others who gather in subway waiting areas. This is because the set screw may only be loosened by utilizing a predesigned wrench. Consequently, a substantially tamper-resistant assembly is achieved.

In addition, the assembly of the invention may also be used in large warehouses, so that interior vehicles, while transporting merchandise from one area to another, can tell whether or not an approaching second vehicle will reach a common intersection.

Further, the mirror assembly is suitable for passenger elevators, so that a passenger can tell whether or not a thief or robber hiding in the inside of the elevator is present.

Moreover, the mirror assembly is suitable for use in other waiting areas where expanded viewing is required, as well as for restaurants, etc.

It will thus be seen that the objects set forth above, among those made apparent from the preceding description, are efficiently obtained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention of which, as a matter of language, might be said to fall therebetween.

I claim:

1. a mirror assembly comprising:

a mirror means for supporting the mirror;

means for connecting the supporting means to the mirror comprising a female element and a male element matingly engaging the female element;

first means for enabling rotation of said mirror about a first axis comprising said female element and said male element;

a shaft extending through said male and female elements for enabling rotatable pivoting of said male element with respect to said female element;

means for preventing the male element from rotatably pivoting with respect to the female element comprising at least one set screw located in said female element and adapted to be tightened against said male element; and second means for enabling rotation of said mirror about a second axis substantially perpendicular to the first axis comprising a cap member rotatably mounted on said supporting means.

2. The assembly of claim 1 wherein said female element comprises a pair of parallel plates defining a gap therebetween, said male element being received in said gap when said male and female elements are matingly engaged.

3. The mirror assembly of claim 1, wherein said supporting means comprises a base and a pedestal mounted on said base.

4. The assembly of claim 3, wherein said cap member is rotatably mounted on said pedestal.

5. The assembly of claim 1, wherein said cap member comprises a substantially plainer top and an annular sleeve extending from said top to cover at least a portion of said supporting means.

6. The assembly of claim 5, further including means for preventing said cap member from rotating about said supporting means.

7. The assembly of claim 6, wherein said rotating preventing means comprises means for pressing against said supporting means.

8. The assembly of claim 7, wherein said pressing means comprises at least one set screw extending through said sleeve of said cap member and adaptor to be tightened against said supporting means.

9. The assembly of claim 8, wherein said supporting means includes an annular groove for receiving said at least one set screw when tightened against said supporting means.

10. The assembly of claim 8, wherein each of said at least one screw comprises a head and a threaded element.

11. The assembly of claim 10, wherein said head of said set screws is selectively engageable with a pre-designed tool element.

12. The assembly of claim 11, wherein said head of said set screws comprises a hexagonal rim and projecting a pin, said rim and said pin defining an annular opening therebetween, said tool element having an opening for matingly receiving said pin of said set screws.

13. The assembly of said claim 1, wherein said at least one set screw comprises a head and a threaded element.

14. The assembly of claim 13, wherein said head of said at least one set screw is selectively engageable with a pre-designed tool element.

15. The assembly of claim 14, wherein said head of said at least one set screw comprises a hexagonal rim and a projecting pin, said head and said pin defining an annular opening therebetween, said tool element having an opening for matingly receiving said pin of said head of said at least one set screw.

16. A mirror assembly comprising:
a mirror;
means for supporting the mirror;
means for connecting the supporting means to the mirror comprising a female element and a male element matingly engaging the female element;
first means for enabling rotation of said mirror about a first axis comprising said female element and said male element;
means for preventing the male element from rotatable pivoting with respect to the female element comprising at least one set screw located in said female element and adapted to be tightened against said male element, said at least one set screw comprising a head and threaded element, said head of said at least one set screw comprising a hexagonal rim and a projecting pin for defining an annular opening therebetween, said at least one set screw being selectively engageable with a pre-designed tool element having an opening for matingly receiving said pin of said at least one set screw; and
second means for enabling rotation of said mirror about a second axis substantially perpendicular to said first axis.

17. The mirror of claim 16, wherein said second enabling rotation means comprises a cap member rotatably mounted on said supporting means.

18. The assembly of claim 17, further including means for preventing said cap member from rotating about said supporting means.

19. The assembly of claim 18, wherein said rotating preventing means comprises means for pressing against supporting means.

20. The assembly of claim 19, wherein said pressing means comprises at least one set screw located in said cap member and adapted to be tightened against said supporting means.

21. A tamper resistant mirror assembly comprising:
a mirror;
means for supporting the mirror;
means for connecting the supporting means to the mirror comprising a female element and a male element matingly engaging the female element;
first means for enabling rotation of said mirror about a first axis comprising said female element and said male element;
a shaft extending through said male and female elements enabling rotatable pivoting of the male element with respect to the female element;
means for enabling the position of the mirror to be fixed at any angular position about the first axis, said first axis enabling position means comprising means for pressing against the male element, said male element pressing means being retained by said female element and comprising at least one set screw adapted to be tightened against said male element for preventing the male element from rotatably pivoting;
second means for enabling rotation of the mirror about a second axis substantially perpendicular to the first axis comprising a cap member rotatably mounted on the supporting means; and
means for enabling the position of the mirror to be fixed at any angular position about the second axis comprising means for pressing against the supporting means, said pressing means comprising at least one set screw retained by the cap member and adapted to be tightened against the supporting means in order to prevent rotation of said cap member thereabout;
wherein each of said at least one set screws may only be loosened by a tool element pre-designed for selective mating engagement with said set screws, each of said set screws comprising a head and a threaded element, said head comprising a hexagonal rim and a projecting pin for defining an annular opening therebetween, said tool element having an opening for matingly receiving the pin of said head of said set screws.

* * * * *